US005615008A

United States Patent [19]
Stachelek

[11] Patent Number: 5,615,008
[45] Date of Patent: Mar. 25, 1997

[54] OPTICAL WAVEGUIDE INTEGRATED SPECTROMETER

[75] Inventor: Thomas M. Stachelek, Fullerton, Calif.

[73] Assignee: Beckman Instruments, Inc., Fullerton, Calif.

[21] Appl. No.: 361,314

[22] Filed: Dec. 21, 1994

[51] Int. Cl.[6] .................. G01J 3/18; G01J 3/44; G01N 21/64; G01N 21/65
[52] U.S. Cl. .................. 356/301; 356/318; 356/328; 250/458.1; 385/14; 385/37
[58] Field of Search .................. 356/301, 317, 356/318, 417, 128, 326, 328, 344; 250/458.1, 459.1, 461.1, 461.2, 227.23; 385/12, 14, 37, 129, 901

[56] References Cited

U.S. PATENT DOCUMENTS

| | | |
|---|---|---|
| 3,891,302 | 6/1975 | Dabby et al. . |
| 4,466,694 | 8/1984 | MacDonald . |
| 4,737,014 | 4/1988 | Green . |
| 4,750,837 | 6/1988 | Gifford et al. ............... 356/417 |
| 4,773,063 | 9/1988 | Hunsperger et al. ............. 385/14 |
| 4,807,950 | 2/1989 | Glenn et al. . |
| 4,929,049 | 5/1990 | Le Goullon et al. . |
| 4,929,050 | 5/1990 | Wilson . |
| 5,007,705 | 4/1991 | Morrey et al. . |
| 5,026,139 | 6/1991 | Klainer et al. . |
| 5,042,897 | 8/1991 | Meltz et al. . |
| 5,061,032 | 10/1991 | Meltz et al. ............. 385/37 |
| 5,082,629 | 1/1992 | Burgess, Jr. et al. ............. 356/128 |
| 5,153,670 | 10/1992 | Jannson et al. ............. 356/301 |
| 5,165,005 | 11/1992 | Klainer et al. . |
| 5,221,957 | 6/1993 | Jannson et al. ............. 356/301 |
| 5,253,037 | 10/1993 | Klainer et al. . |
| 5,303,316 | 4/1994 | Hammer ............. 385/37 |
| 5,307,437 | 4/1994 | Facq et al. ............. 385/124 |
| 5,312,535 | 5/1994 | Waska et al. ............. 356/344 |
| 5,351,321 | 9/1994 | Snitzer et al. ............. 385/10 |
| 5,355,237 | 10/1994 | Lang et al. ............. 385/14 |
| 5,446,534 | 8/1995 | Goldman ............. 356/328 |

OTHER PUBLICATIONS

Bruno et al, "On–Column Capillary Flow Cell Utilizing Optical Waveguides for Chromatographic Applications", Analytical Chemistry, vol. 61, No. 8, Apr. 15, 1989, pp. 876–883.

Primary Examiner—F. L. Evans
Attorney, Agent, or Firm—William H. May; Janis C. Henry

[57] ABSTRACT

An analytical system uses a waveguide having embedded Bragg gratings to redirect light from the waveguide outwardly for analytical determination by detectors. The analytical system can be a spectrophotometer, spectrofluorimeter, or other means for analyzing the components of light passed through a sample or emanating from a sample. The system can be single or multi-channeled and can be integrated with a detector onto a single chip device. A manifold with multiple input waveguides and multiple output waveguides is also provided. The interaction point between the input and output waveguides is a target area in which a sample capillary tube can be located.

57 Claims, 5 Drawing Sheets

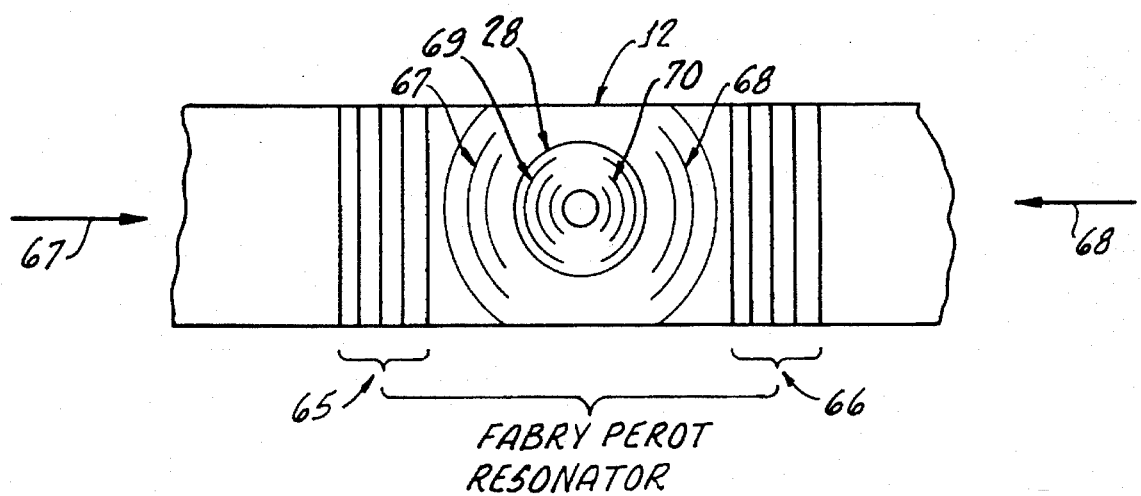
FABRY PEROT
RESONATOR
_Fig. 8._
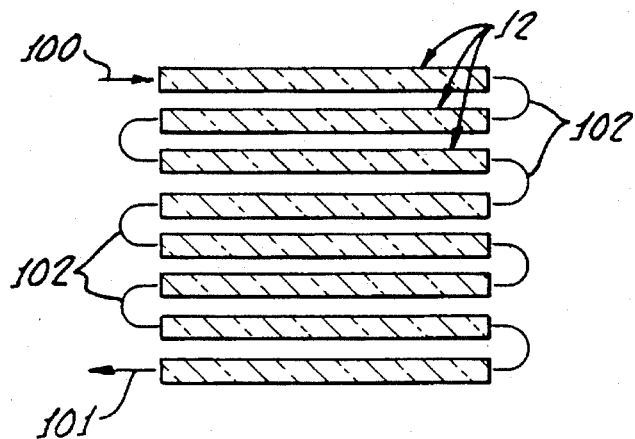
_Fig. 9._

1

OPTICAL WAVEGUIDE INTEGRATED SPECTROMETER

BACKGROUND

Having an accurate system for determining constituents of analytes in medical and clinical samples is highly desirable.

This invention relates to optical waveguides for analytical purposes. In particular, the invention is concerned with using such waveguides in spectrophotometers, clinical diagnostic instruments and analytical ultracentrifuges.

There is a need for a compact, stable and low cost means of separating white light into component colors. The intensity of these colors should be detected in a manner which allows a qualitative and/or quantitative estimate of the chemical content of the chemical and medical samples probed by the light. The medical or clinical sample can either be flowing or static, and the light emanating from, through or in relation to the sample is a measure of the constituents of that sample. There is also a need to increase the sensitivity and reliability of measurements made by such a system.

Existing analytical instruments use the interaction of light with a sample to provide a measure of the characteristics of the sample. The interacted light is focused onto a detector to provide the measurement. Some of the known means for detecting the light transmit the light from the sample through a waveguide to the detector in the instrument. In these known systems the method of transmitting the light is not always efficiently and effectively conducted along the waveguide and to the sample. There is a need to improve the transmission of light from the sample to the detector of the analytical means in an efficient cost effective way.

It is known to have optical waveguides which use Bragg diffraction means with a waveguide. These Bragg diffraction means in the waveguide are used to concentrate light and focus light and provide holographic representations.

Bragg diffraction has been utilized in other spectrometers. These suffer from being implemented in a macro component design and hence are large and expensive to fabricate. They require multiple process steps in component manufacture and alignment and are not as stable. They consist of multiple components which can all move more easily with respect to each other due to mechanical vibrations or thermal effects. There is a need to apply waveguides using Bragg diffraction means efficiently in analytical instruments, particularly analytical instruments related to measuring of clinical and medical samples.

SUMMARY

By this invention there is provided an analytical system and method for effecting an analytical determination in a manner which minimizes the disadvantages of known systems.

According to the invention there is a provided a wave guide portion of solid material capable of guiding light along a first path from a first end of the guide towards a second end. There is at least one first grating region embedded in said waveguide portion. A multitude of grating elements is constituted by axially successive refractive index variations in the solid material and extends at such respective spacings as to redirect at least some components of the light reaching said grating elements externally to said waveguide portion.

The first grating region is recorded by light in a transmission mode and ejects light in a reflection mode from the grating.

Means is provided external to said waveguide portion for receiving said light for analytical determination of the components of the light.

This can be for spectroscopically analyzing the components of light enamating from the waveguide redirected light to obtain a measure of the intensity of the components of light.

In one preferred form of the invention there can be at least two different first grating regions embedded in the waveguide, each respective first grating region acting to reflect light of different wavelengths from the waveguide.

The system can also include at least one other second grating region to act as a filter grating. The filter grating acts to reject light of selected wavelengths prior to interaction of the light with the first grating region.

A detector is preferably located in adjacency with the waveguide, the detector acting to measure the components of light redirected from the waveguide.

In one preferred form, there are multiple waveguides located in physical adjacency relative to each other on a substrate. Multiple detectors are located in relation to the substrate thereby to measure components of the light emanating from the respectively multiple waveguides.

In a system where there are multiple detectors located in an integrated chip, the integrated chip is physically located in adjacency with the substrate having the multiple waveguides. As such each waveguide is related to a respective selected detector. The multiple waveguides and multiple detectors are integrated into a single unit.

A system also includes capillary means in adjacency with the waveguide wherein the light input to the waveguide is obtained from the capillary carrying a fluid. The capillary is located substantially transverse to a light source which subjects the capillary to incident light. The light emanating from the capillary as a result of reaction with a fluid passing through the capillary is input to the waveguide.

The light analyzed can represent a measure of fluorescence of the fluid passing through the capillary at the input to the waveguide.

In another aspect of the invention, the first grating region rejects light components of a selected wavelength, and the rejected light components eliminate undesirable scattered light by redirecting such light components out of the waveguide. The rejected light is light generated by Raman scattering. The detector is located at an end of the waveguide remote from the first end and detects light components passing through the first grating region.

According to another feature of this aspect of the invention there is a capillary tube located at the target position. The capillary tube has an outer diameter and a capillary bore. The capillary tube is located substantially transverse to the first waveguide and second waveguide.

The first waveguide defines a width, and that width is preferably substantially equal to the capillary bore. The second waveguide defines a width, wherein the width of the second waveguide is preferably substantially equal to the outer diameter of the capillary bore.

A first block is located adjacent to the capillary tube which effectively reflects light directed from the first waveguide back through the capillary tube. A second block is located adjacent to the capillary tube opposite to the second waveguide thereby to facilitate transmission of light in the second waveguide. The second block acts as a reflector for the emission of light from the capillary tube down the second waveguide.

There can be multiple first waveguides, and multiple second waveguides and their respective targets. Each of the multiple first waveguides are in communication with the respective multiple second waveguides thereby to constitute an input and output manifold.

The invention is further described with references to the accompanying drawings.

DRAWINGS

FIG. 5c is a detailed view of an end portion of multiple waveguides shown in plan view in FIG. 5a;

FIG. 8 is a representation of an exciting resonator using the waveguide system of the invention.

FIG. 9 illustrates a representation of a serpentine waveguide.

DESCRIPTION

An analytic system and method utilizes an optical fiber or waveguide capable of supporting one or more guided modes to contain white light. The light is separated into its components or colors by diffraction from either a phase or absorptive diffraction grating. The grating is either a volume or surface grating type.

Figure 1:
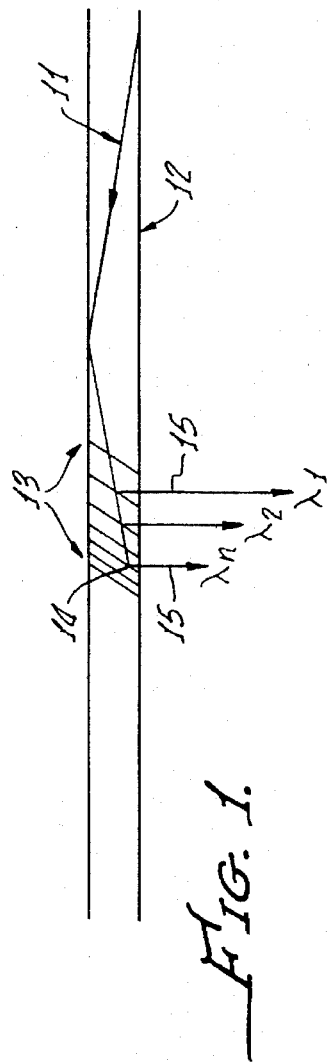
FIG. 1 is a representation of a concept of an analytical system showing the waveguide and illustrating the invention.

The concept is illustrated below in FIG. 1. A beam of light 11 is composed of a multitude of wavelengths and propagates within an optical waveguide or fiber 12 in guided modes of the waveguide. The waveguide 12 is a solid material capable of guiding input light along a first path from a first end of the guide towards a second end. Embedded, by being written, within the waveguide 12 is a first grating region, namely a diffraction grating 13, whose diffracting surfaces are illustrated as planar surfaces 14. The normals of the surfaces are oriented at an angle to the propagation direction of the light beam 11.

There are a multitude of grating elements or surfaces 14 constituted by axially successive refractive index variations in the solid material. The grating elements 14 extend at such respective spacings to redirect at least some components of the light reaching said grating elements externally of said waveguide portion.

Upon striking the diffracting elements or surfaces 14, a portion of the white light of wavelength, $\lambda_1$, is diffracted out of the guided mode(s) into one or more radiation modes. The wavelength diffracted out of the waveguide 12 depends on the optical thickness between the diffracting surfaces 14 and the propagation constant(s) of the guided mode(s) within which the light 11 is propagating.

If diffraction grating, 13, is composed of multiple gratings of different intersurface optical thickness whose structures are either placed sequentially along the waveguide or interspersed, a variety of light components 15 of different wavelengths, $\lambda_n$ (n=1,2, . . . ), are diffracted out the guided mode(s). This depends on the intersurface optical thickness of each grating substructure. Once in radiation modes, the individual light wavelength components 15 may be separated by either their spatial difference along the fiber 12 and/or as a result of angular separation.

Conversion of the optical signals into electronic signals can be accomplished by either a single or multiple element optical detector of either the semiconductor or the electroemissive type placed so as to intercept the radiation modes. External optical elements can collect the optical radiation from each of the radiation modes. Preferably this can be accomplished by adding optical power to the diffracting surfaces 14 for arranging that these surfaces 14 have curvature. Such curvature could be arranged by exposing a photosensitive waveguide to the interference pattern formed by the intersection of two coherent optical beams one or both of which are either converging or diverging.

The diffraction grating 13 can be recorded, written or embedded in the waveguide 12 which is a glassy, crystalline or polymeric material, which is either organic or inorganic. The grating 13 can be written by exposure of photosensitive material to the interference pattern formed by an amplitude division or wavefront division, namely grating, interferometer or by photolithographic means. The waveguide material can be self-developing or can require process steps which either precede, succeed or are concurrent with exposure. This could be sensitization prior to exposure, or development subsequent to exposure. The material requirement is that the processed material be transparent to the wavelengths of interest and that it support a diffraction grating structure 13.

The analytical system comprises the waveguide 12 in cooperation with a detector and analytical means external to the waveguide 12 for receiving the light components for analytical determination of the components of the light.

Different embodiments of analytical instrument are now described.

Figure 2:
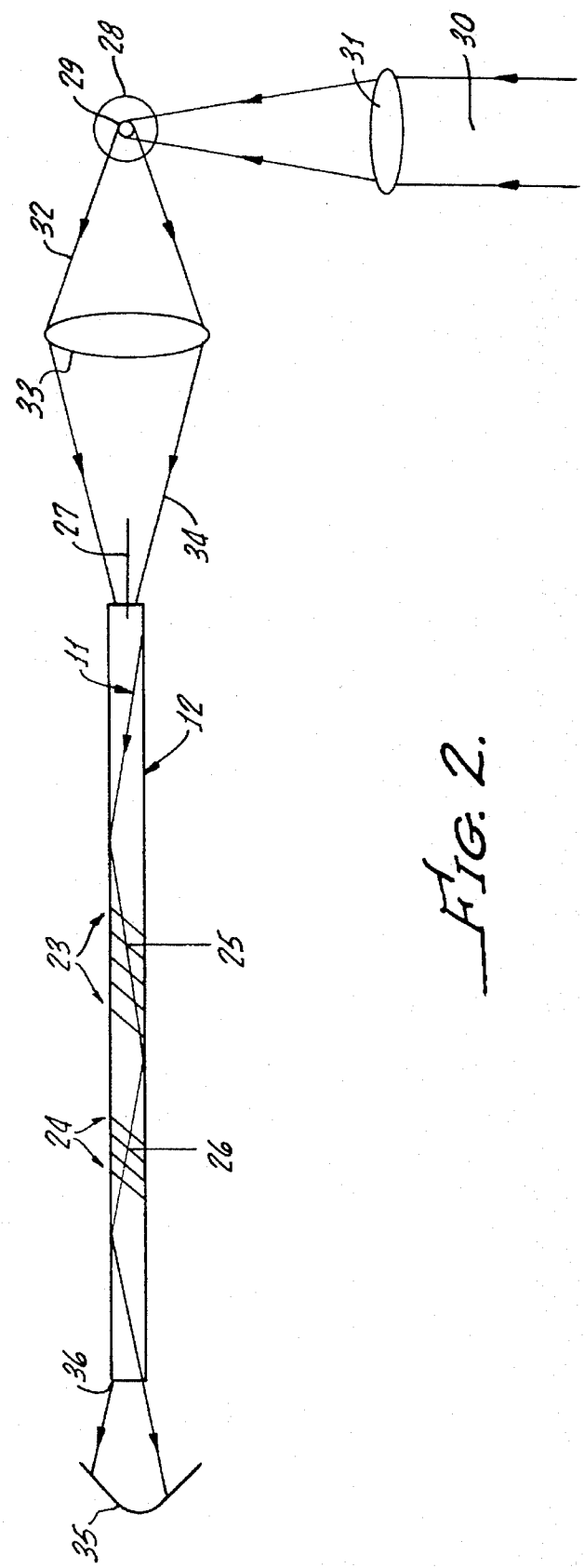
FIG. 2 is a representation of a fluorescence excitation filter in a waveguide.

Fluorescence Excitation Filter (FIG. 2)

A fluorescence excitation filter is illustrated in FIG. 2.

An input to the waveguide 12 is a result of light emitted from a capillary 28. The capillary is located transversely relative to the axis 27 of the waveguide 12. Fluid passes through the bore 29 of the capillary 28. The fluid is the analyte on which the chemical constituent analysis is performed. On one side of the capillary 28, there is an input light beam 30 which is directed through a focusing lens 31 towards the bore 29 of the capillary. The output from the capillary bore 29 is a diverging light beam 32. This is passed through a focusing lens 33 and converges as indicated by lines 34 to the input of the waveguide 12 at one end of the waveguide 12.

The light beam then travels as indicated by line 11 through the waveguide 12 and interacts with the Bragg gratings 23 and 24. A photodetector 35 is located downstream of the output end 36 of the waveguide 12 and this can provide a measure of the chemical constituents of the fluid passing through the capillary bore 29.

The rejected components of light 25 and 26 are directed to detectors located in transverse relationship to the waveguide and these components can be suitably measured to obtain more information as required.

Holographic notch and long-pass filters available in the prior art are configured in a thin film format on a glass substrate. This prior art arrangement is limited in band rejection efficiency by the thinness of the Bragg grating. Further such filters are usually limited to rejection of a single wavelength, usually the laser excitation wavelength.

While such known filters can be configured in multi-plexed configuration, such multiplexing involves a spatial inter-leaving of the Bragg structures for each rejection band. This, in turn, leads to a decrease in the rejection efficiency of each band since the available index of refraction modulation is material limited and must be shared between each of the gratings.

The invented system utilizes grating recording in the transmission mode and playback in the reflection mode. An unlimited interaction length is provided by the waveguide 12. The gratings 23 and 24 are spatially separated and contain an unlimited number of rejection bands without a concomitant loss in efficiency. These are used to reject multiple interferences such as those generated by Raman scattering, and/or scattered excitation light.

If one or more of the Bragg gratings 23 and 24 is constructed with the normal to the index planes at an angle to the waveguide axis 27, the Raman interferences may be monitored and used to correct the fluorescence signal for noise induced by noise in the excitation beam. Such a correction scheme is more effective than monitoring the excitation beam itself.

The Bragg gratings 23 and 24 allow a lower cost implementation of this scheme which is now done with a conventional grating monochromator and a multichannel (CCD) detector.

The output from the Bragg grating 23 is a component 25 of the light, and the output from the Bragg grating 24 is a component 26 of the light.

Figure 3:
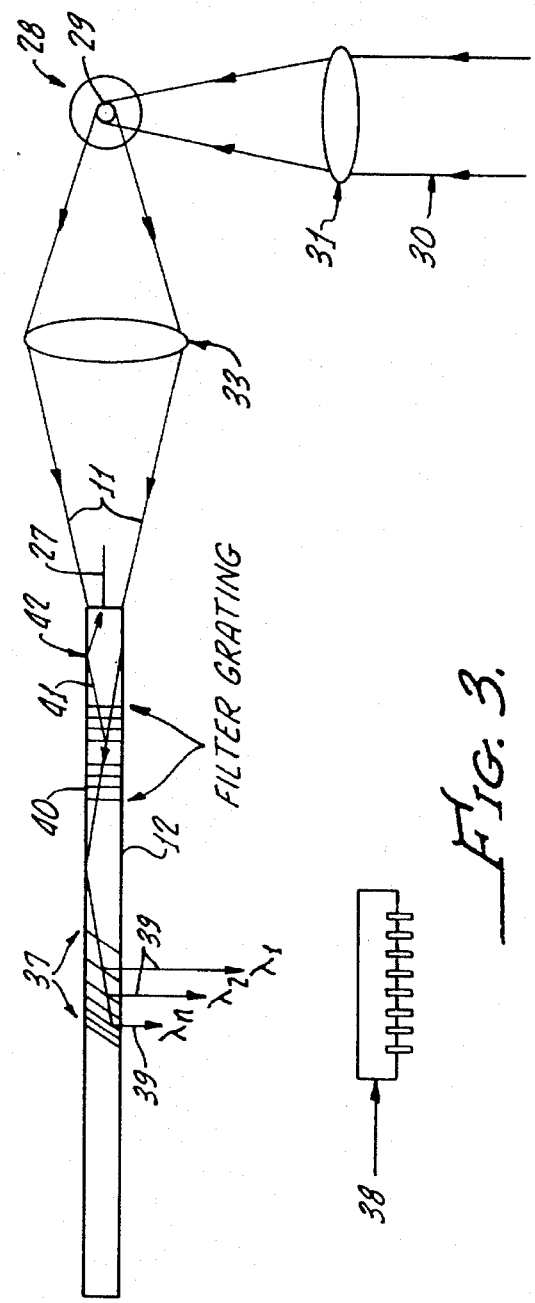
FIG. 3 is a representation of single channel spectrofluorimeter in a waveguide.

Single Channel Spectrofluorimeter (FIG. 3)

The single channel spectrofluorimeter illustrated in FIG. 3 is an extension of the fluorescence excitation filter to include either a chirped grating 37 or a series of constant period gratings to effect the output of the gratings 23 and 24 in the waveguide 12. This can then be integrated with a multiphotochannel detector 38. The resulting package, combined with one channel of the integrated excitation/emission manifold constitutes a highly integrated LIF detector offering all the advantages of the fluorescence excitation filter combined with the extra information provided by wavelength analysis.

The advantages of integration include lower cost and size and greater thermal and mechanical stability and reliability than the prior art. In addition, the use of Bragg diffraction in the wavelength dispersion section yields a higher diffraction efficiency device since efficiencies approaching 100% are possible. This is in comparison to the 65% best case efficiency of a surface relief reflection grating.

The chirped grating 37 has different spacings such that the components 39 of light directed from the waveguide 12 are at different wavelengths as indicated.

A second grating region, a multi-grating 40 is provided to filter light components from the input light coming into the waveguide 12. Components 41 of the input light 11 are rejected or redirected rearwardly and outwardly as indicated by arrow 42 from the first end of the waveguide 12.

In this embodiment as illustrated in FIG. 3 there is no photodetector 35 at the second end of the waveguide 12. The detector 38 is located transversely to the waveguide 12 to measure the components of the light redirected transversely from the waveguide 12.

Figure 4:
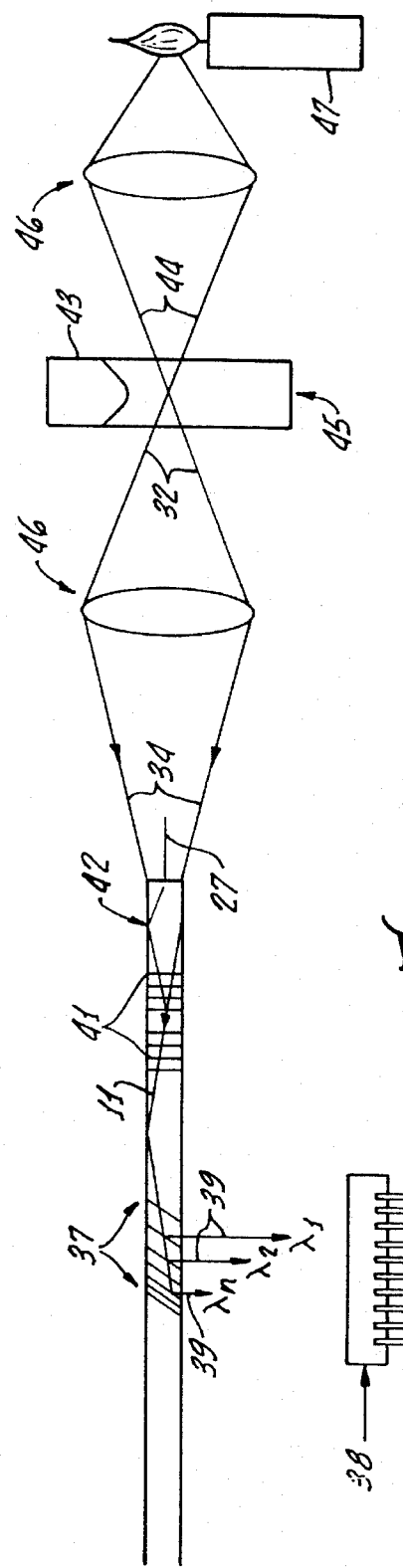
FIG. 4 is a representation of single channel spectrophotometer in a waveguide.

The Single Channel Spectrophotometer (FIG. 4)

The construction of the single channel spectrophotometer is illustrated in FIG. 4. It includes a sample cell 43 through which the probe light 44 is directed. The fluid 45 is contained in the sample cell 43. An input lens 46 focuses the excitation light which originates from the source 47 as indicated.

The single channel spectrophotometer is the general case of the single channel spectrofluorimeter in which the sample emission light is replaced by light from a synthetic light source 47. This is usually broad band, such as a tungsten filament or a discharge in a gas such as deuterium or mercury.

The method is more general than fluorescence photometry since not every chemical species emits light when photoexcited and the method can easily be made quantitative. The technique involves the quantitative recording of the source intensity as a function of wavelength. This is effected firstly without and then with a sample present between the source and detector. The logarithm of the ratio of these two recordings then yields the absorption spectrum. At any wavelength, the signal is directly proportional to the product of the molar absorptivity, the sample concentration and the sample thickness for a single chemical species. The absorbance is thus used to measure any one of these three quantities if the other two are known by independent means.

Determining the true absorbance of highly concentrated samples is often complicated by the presence of stray light, i.e., light of wavelength outside the passband of the monochromator. Such light may lie outside the light-absorbing region of a highly absorbing sample and hence will be transmitted by the sample. Thus, a sample which is actually opaque at a given wavelength may appear not to be when measured in a spectrophotometer having high stray light.

A source of stray light in the prior art arises from the generation of multiple order beams by diffraction from the surface relief structures used in the current art. Use of Bragg structures to disperse the light eliminates this higher order light and hence this source of stray light. The dynamic range of the spectrophotometer thus is expanded.

This source of stray light can be eliminated by the use of dispersive elements, for instance, prisms, rather than diffractive elements to disperse the light. Such elements are not easily micro-integrated and hence are subject to higher costs and lower stability and reliability. In addition, such systems usually exhibit nonlinear dispersion and nonlinearly varying dispersion leading to inefficient utilization of multiphotoelement detectors.

The Multichannel Spectrofluorimeter (FIGS. 5a to 5d)

A multichannel spectrofluorimeter is an extension of the single channel spectrofluorimeter incorporating many channels of the integrated excitation/emission manifold.

Bragg gratings are utilized and the spectrofluorimeter is mounted on a two dimensional array detector (e.g., CCD). One dimension is used to separate capillary channels while the other dimension is used to separate wavelength.

In this case, prefilter diffraction gratings 40 may be unnecessary since excitation and Raman scattering can be separated from emission by the Bragg gratings and detected independently. Alternatively the scattering may simply not be diffracted and allowed to pass out of the end of the waveguide by omitting the Bragg structure appropriate to these wavelengths in the waveguide. The system can be made highly discriminatory toward excitation and Raman scattering without the need for expensive, bulky and somewhat finicky dichroic filters. The ability to focus the light exiting the Bragg grating structures is a key feature in minimizing cross talk between capillary channels.

Alternatively, integration of the Bragg grating structures directly onto the silicon detector chip may obviate the need for focussing.

Figure 5A:
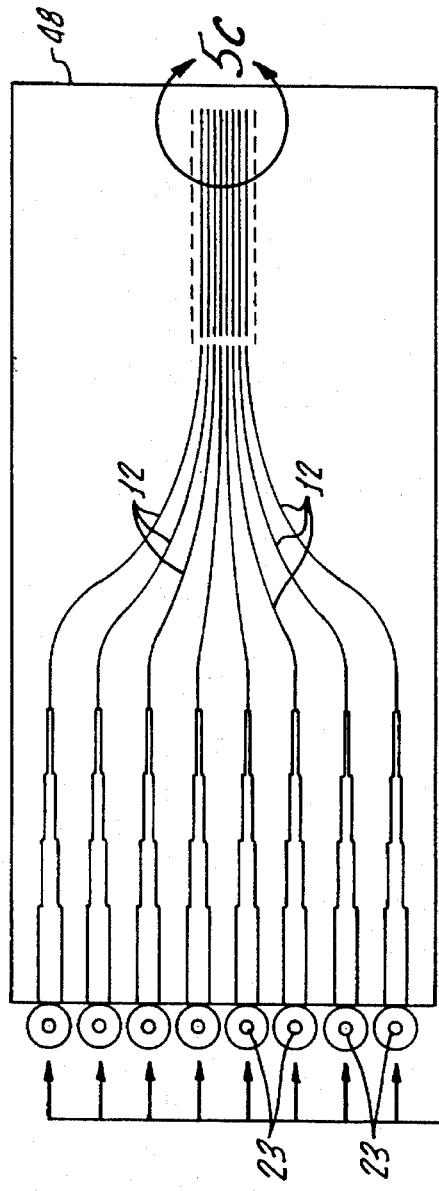
FIG. 5a is a plan view representation of a multichannel spectrofluorimeter showing multiple waveguides on a substrate.
Figure 5D:
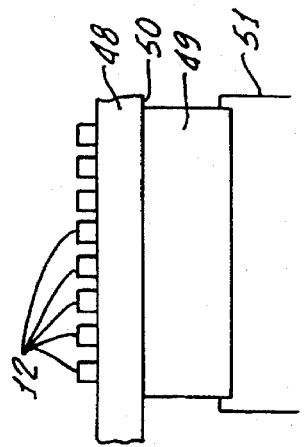
FIG. 5d is an end view of a the integrated unit showing the multiple waveguides formed on the substrate.
Figure 5C:
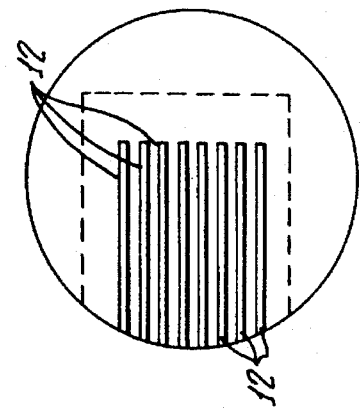
Figure 5B:
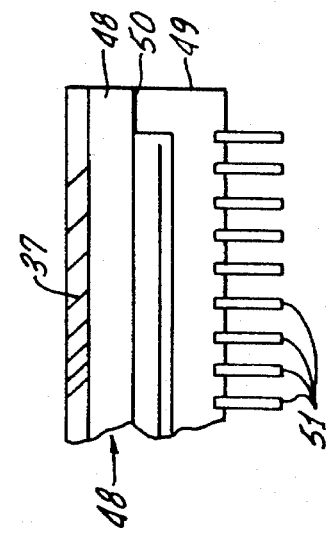
FIG. 5b is a cross-sectional view of a portion of the substrate illustrated in FIG. 5a illustrating the waveguides and the detector as an integrated unit.

A fused silica substrate 48 has formed thereon the manifold to constitute the multiple waveguides 12 which traverse a first plane above the substrate. This configuration can be formed on top of the substrate as illustrated in FIG. 5d. The input ends of the waveguide 12 are located adjacent to multiple capillaries 28 so that light from the capillaries 28 can be directed into each of the respective waveguides 12. In this manner, multiple samples in each of the multiple capillaries 28, respectively, can be directed to the substrate of this spectrofluorimeter to provide a multi-channel device.

Bragg gratings 37 are located towards the end of the waveguides 12 so that light can be directed transversely through the fused silica substrate 48 to a CCD chip 38 which acts as a detector. The chip carrier 49 is bonded with a silica/ceramic bond 50 to the substrate such that the detector in each case is aligned appropriately with the respective Bragg grating 37 in each of the waveguide 12. Outputs 51 from the CCD chip result in multiple readings to be obtained from the multi- channel device.

Figure 7A:
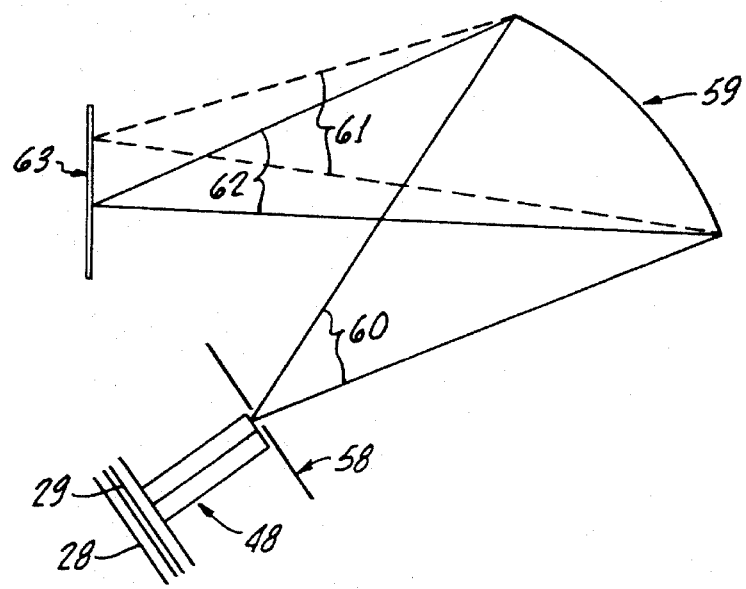
FIG. 7a is a representation of a dispersive implementation of a multichannel fluorimeter using multiple waveguides in terms of the invention.
Figure 7B:
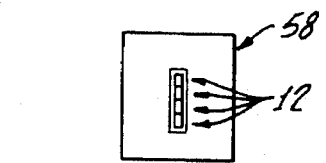
FIG. 7b is a representation of a front view of the different channels of the waveguides facing the entrance slit of the dispersive fluorimeter.

If Bragg grating structures are not used, the output of the multi-channel spectrofluorimeter may be used as the entrance slit of a conventional polychromator with a two-dimensional array detector mounted in the exit plane and the two detector dimensions used as before. This is illustrated in FIGS. 7a and 7b and discussed below. In this case, spectral separation of scattering from emission may be sufficient to discriminate against spectral interference.

The use of Bragg grating prefilters 40 reduces scattering and provides the ultimate in emission sensitivity.

Figure 6:
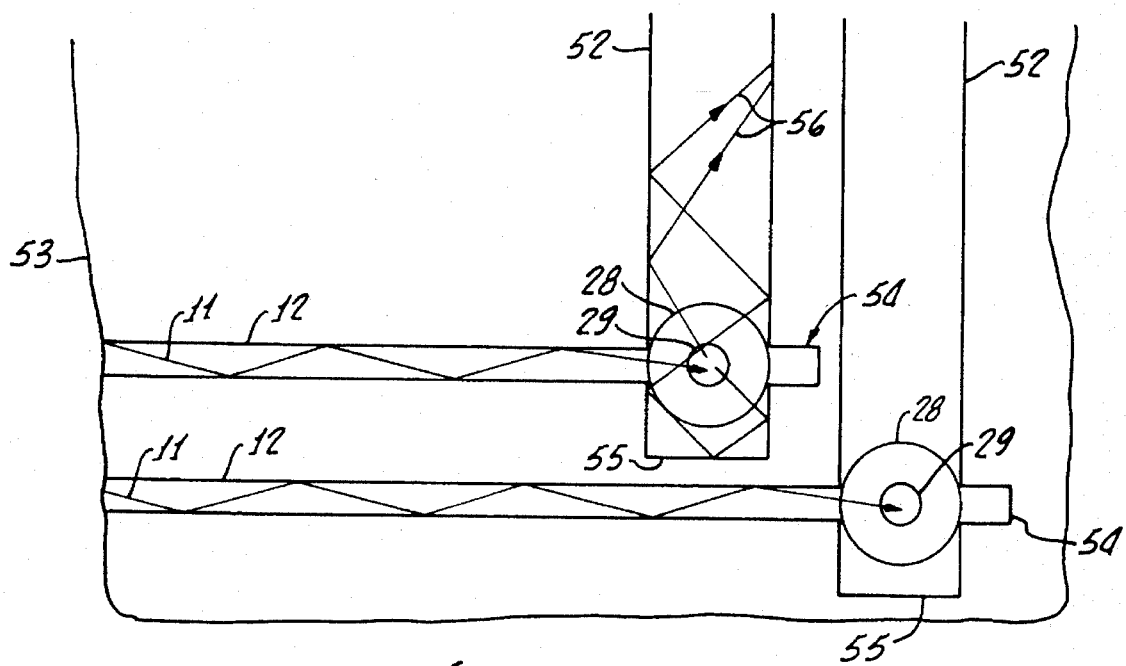
FIG. 6 is a representation of an integrated excitation emission manifold using multiple waveguides.

Integrated Excitation Emission Manifold (FIG. 6)

An integrated excitation emission manifold is illustrated in FIG. 6. There is a mutually perpendicular array of capillaries 28, excitation waveguides 12 and emission collection waveguides 52. The excitation waveguides 12 and emission collection waveguides 52 are fabricated on a common substrate 53. At the intersection points are respective targets placed on a line at 45° to the axes of the excitation and emission collection waveguides 12 and 52.

Capillaries 28 are threaded through holes drilled in the common substrate 53 after removal of a protective plastic coating from the capillary 28. The capillaries 28 can be cemented in place with an adhesive which matches the index of refraction of the waveguide core and the capillary wall. This maximizes the transfer of the excitation light to and the emission light from the capillaries 28 while minimizing the scattering of both excitation and emission light.

The unused ends of the waveguides 12 and 52 are terminated in reflecting structures 54 and 55, respectively. This effectively increases the numerical aperture or light gathering power of each waveguide system, since the excitation light can make multiple passes through the sample in the capillaries 28.

In the configuration shown, the diameter of the excitation waveguide 12 is equal to the internal bore 29 of the capillary 28. The diameter of the emission waveguide 52 is equal to the external perimeter of the capillary tube 28. The emitted light is illustrated as lines 56 passing through the emission waveguide 52 having been reflected from the reflecting structure 55 on the opposite side of the capillary 28.

Multi-Channel Fluorimeter (FIGS. 7a and 7b)

FIGS. 7a and 7b show a schematic of a free space implementation of the multi-channel fluorimeter. The multichannel fluorimeter is placed at the entrance slit 58 of the polychromator. The spectral dispersive and imaging structure 59, shown as a surface relief concave grating disperses the light 60 coming from the exit slit 58. The light is reimaged as the reflected light of two different wavelength components 61 and 62 at the exit plane where a two dimensional multi-element array detector 63 is located. The detector 63 is a CCD but could be of any type of two dimensional detector, including a video camera.

The spectral dispersive and imaging structure can be made up of separate imaging and dispersive elements for instance, a flat plane grating or a prism for dispersion and lens(es) or mirror(s) for imaging. If a prism is used for dispersion, the multiple order interference does not exist. Prism dispersers have other disadvantages. Dispersion is nonlinear, namely, the wavelength position is not a linear function of distance along the detector. This results in inefficient use of the multi-element array detector 63. Also, prisms are expensive.

Spectrophotometric analysis takes place in the plane of the page for each fluorescence channel. Each channel is then represented by a separate plane.

Waveguide Excitation Resonator (FIG. 8)

FIG. 8 is a representation of the waveguide excitation resonator 64 in which two grating structures 65 and 66 surround a capillary sample tube 28 which is embedded in the waveguide 12. The grating structures 65 and 66 are tuned to reflect the excitation light which is carried by the excitation waveguide 12. This light may be incident from either direction 67 or 68.

The excitation efficiency is improved by placing a Bragg grating structure 13 on either side of the capillary 28 in the excitation waveguide. This guided wave Fabry-Perot structure allows multiple pass excitation, thereby insuring the ultimate absorption of every excitation photon. Embedding a similar Fabry-Perot structure in the emission waveguide 52 allows resonance of the emission and the construction of waveguide dye layers. Matching of the index of refraction between waveguide core and capillary wall could be critical to this application.

There are three arrangements for the Fabry Perot resonator. In the first two, the grating structure 65 and 66 has been written in the waveguide 12. The first implementation involves planar gratings.

In the second embodiment there is a cylindrical or possibly spherical grating arrangement 67 and 68 in a confocal arrangement. In such a situation, the gratings continually refocus the light.

The third embodiment is a confocal arrangement with the gratings 69 and 70 written in the sample cell shown as a capillary 28.

Advantages

This invention is superior to prior art involving separation of color by diffraction from surface relief structures. Diffraction in terms of the invention takes place into a single diffraction order and diffraction efficiency can exceed 90%. In the case of diffraction by surface relief structures, diffraction occurs into multiple diffraction orders and efficiency is limited to less than 65%.

The present invention minimizes the path length in air through which the separated colors must travel before being converted into an electronic signal. Hence, the uncertainty introduced by scattering of the light from airborne particles or by diffraction and refraction from variations in the refractive index of air, namely the Schlieren effect, are minimized. Finally, prior art use of volume holograms to separate light into its component colors relies on a physical separation of the input slit and the grating. This results in two deleterious effects overcome by this invention.

First, the airspace in the prior art makes the device subject to noise introduced by scattering, diffraction and deflection of the beam from moving dust particles in air as well as time varying index of refraction inhomogeneities. Second, the light to be separated encounters an air grating interface which can reflect light. This reflected light reduces the intensity of the beam and can be a serious source of stray light in the instrument.

Advantages of this invention include the following features:

1. Small size.
2. Monolithic optical structure.
3. Integration of light injection, separation and collection optics.
4. High optical speed.
5. Less interference from stray light.
6. High mechanical and thermal stability.
7. Low fabrication cost.
8. Less interference from the Schlieren effect.
9. Easily integratable into detector.
10. Facile implementation into multiplex detection of many light beams.
11. Easily extended into high spectral resolution.

General

Many other forms of the invention exist, each differing from the other in matters of detail only.

For instance, the invention is also used to implement a planar waveguide device. As such, it facilitates support of parallel detection channels. An area photodetector of the charge coupled or charge injection type is preferred as the light to electronic conversion device.

The parallel detection channels might then be linked at adjacent ends to form a longer serpentine structure. An illustration of this is set out in FIG. 9 where there is an input 100 to the waveguides 12 and air output 101. The linking 102 is representatively illustrated to effect the serpentine structure. This permits a more gradual variation in intersurface spacing and hence an increase in spectral resolution since the wavelengths dispersed by the grating structure are spread over a greater number of detector elements.

The device, in its planar waveguide implementation, permits hybrid integration onto the detector by replacement of the detector cover glass with this device. In its planar waveguide implementation, the device permits an arbitrary increase in optical throughput by making the waveguide wider.

The scope of the invention is to be determined solely in terms of the following claims.

What is claimed is:

1. An analytical system comprising:
   a waveguide of solid material capable of guiding input light along a first path from a first end of the waveguide towards a second end;
   at least one first grating region embedded in the waveguide and having a multitude of grating elements constituted by axially successive refractive index variations in the solid material and extending at such respective spacings to redirect at least some components of the light reaching the grating elements externally of the waveguide portion; and
   means external to the waveguide for receiving the light for analytical determination of the components of the light.

2. A system as claimed in claim 1 including means for spectroscopically analyzing the components of light emanating from the waveguide.

3. A system as claimed in claim 1 including means for analyzing the emitted light to obtain a measure of fluorescence of light emanating from the waveguide.

4. A system as claimed in claim 1 including at least two different first grating regions embedded in the waveguide, each respective first grating region acting to redirect light of different wavelengths from the waveguide.

5. A system as claimed in claim 1 including at least one other second grating region, such other second grating region acting as a filter grating, the filter grating rejecting light of selected wavelengths prior to interaction of the light with the first grating region.

6. A system as claimed in claim 1 including a detector located in adjacency with the waveguide, the detector being for measuring the components of light redirected from the waveguide.

7. A system as claimed in claim 1 further including multiple waveguides being located in physical adjacency relative to each other on a substrate, and multiple detectors in relative location with the substrate for respectively measuring components of the light emanating from the respective multiple waveguides.

8. A system as claimed in claim 7 wherein the multiple detectors are located in an integrated chip, the integrated chip being physically located in adjacency with the substrate such that each waveguide is related to a respective selected detector, and wherein the multiple waveguides and multiple detectors are integrated into a single unit.

9. A system as claimed in claim 8 including, for each waveguide, capillary means in adjacency with the waveguide wherein the input light to the waveguide is obtained from the capillary means carrying a fluid, and means for directing the light emanating from the capillary means as a result of reaction with the fluid passing through the capillary as the input light to the waveguide.

10. A system as claimed in claim 1 including capillary means in adjacency with the waveguide wherein the input light to the waveguide is obtained from the capillary means carrying a fluid, the capillary means being located substantially transverse to a light source, means for subjecting the capillary means to incident light from the light source, and means for directing the light emanating from the capillary means as a result of reaction with the fluid passing through the capillary as the input light to the waveguide.

11. A system as claimed in claim 10 wherein the light components analyzed represent a measure of fluorescence of the fluid passing through the capillary means.

12. A system as claimed in claim 1 wherein the first grating region is recorded by light in a transmission mode and detects light in a reflection mode from the grating region.

13. A system as claimed in claim 1 including a detector located adjacent to the waveguide for measuring components the light emanating from the second end of the waveguide.

14. A system as claimed in claim 13 including capillary means in adjacency with the waveguide wherein the input light to the waveguide is obtained from the capillary means carrying a fluid, the capillary means being located substantially transverse to a light source, means for subjecting the capillary means to incident light from the light source, and means for directing the light emanating from the capillary means as a result of reaction with the fluid passing through the capillary as the input light to the waveguide.

15. A system as claimed in claim 2 including capillary means in adjacency with the waveguide wherein the input light to the waveguide is obtained from the capillary means carrying a fluid, the capillary means being located substantially transverse to a light source, means for subjecting the capillary means to incident light from the light source, and means for directing the light emanating from the capillary means as a result of reaction with the fluid passing through the capillary as the input light to the waveguide.

16. A system as claimed in claim 15 including means for passing the input light to the waveguide through a filter grating located downstream from the first end of the waveguide, the filter grating being ahead of the first grating region for redirecting light.

17. A system as claimed in claim 1 including means for locating a sample adjacent to the first end of the waveguide, means for inputting light through the sample and for inputting light emanating from the sample into the first end of the waveguide.

18. A system as claimed in claim 17 wherein the first grating region redirects light components at preselected wavelengths, and includes a detector located adjacent to the waveguide for measuring the redirected light components.

19. An analytical system comprising:

a waveguide of solid material capable of guiding input light along a first path from a first end of the guide towards a second end;

at least one first grating region embedded in the waveguide and having a multitude of grating elements constituted by axially successive refractive index variations in the solid material and extending at such respective spacings to redirect at least some components of the light reaching the grating elements externally of said waveguide portion, and wherein such redirected light components eliminate undesirable scattered light; and means external to the waveguide for receiving the light and for analytically determining light components passing through the first grating region, the light components being determined being those passing through the first grating region and being outputted from an end of the waveguide remote from the first end.

20. A system as claimed in claim 19 wherein the redirected light components are generated by Raman scattering.

21. A waveguide light system comprising:

a first waveguide for directing light towards a predetermined position;

first grating region embedded in the first waveguide and having a multitude of grating elements constituted by axially successive refractive index variations in the waveguide, and extending at such respective spacings to redirect at least some components of the light reaching said grating elements within the first waveguide;

a second waveguide for receiving light from the predetermined position; and a target at the predetermined position through which the light directed to the predetermined position is directed.

22. A system as claimed in claim 21 wherein the first waveguide and second waveguide are located relatively transverse to each other.

23. A system as claimed in claim 22 including a capillary tube at the target, and wherein the capillary tube has an outer diameter and a capillary bore, and wherein the capillary tube is located substantially transverse to the first waveguide and second waveguide.

24. A system as claimed in claim 23 including a first block adjacent to the capillary tube for reflecting light directed from the first waveguide back through the capillary tube, a second block adjacent to the capillary tube opposite to the second waveguide for facilitating transmission of light in the second waveguide, the second block acting as a reflector for the emission of light from the capillary tube into the second waveguide.

25. A system as claimed in claim 23 wherein the first waveguide defines a first width, the first width being substantially equal to the capillary bore, and the second waveguide defines a second width, the second width being substantially equal to the outer diameter of the capillary bore.

26. A system as claimed in claim 22 including multiple first waveguides, and multiple second waveguides, each of the multiple first waveguides being in communication with the respective multiple second waveguides thereby to constitute an input and output manifold.

27. A system as claimed in claim 23 including multiple first waveguides, and multiple second waveguides, each of the multiple first waveguides being in communication with the respective multiple second waveguides thereby to constitute an input and output manifold.

28. A system as claimed in claim 24 including multiple first waveguides, and multiple second waveguides, each of the multiple first waveguides being in communication with the respective multiple second waveguides thereby to constitute an input and output manifold.

29. A waveguide light system comprising:

a waveguide for directing light towards a predetermined position;

at least one first grating region embedded in the waveguide and having a multitude of grating elements constituted by axially successive refractive index variations and extending at such respective spacings to redirect at least some components of the light reaching said grating elements within the waveguide; and a target at the predetermined position through which the light directed to the predetermined position is directed.

30. A system as claimed in claim 29 including a capillary tube at the target, and wherein the capillary tube has an outer diameter and a capillary bore, and wherein the capillary tube is located substantially transverse to the waveguide.

31. A system as claimed in claim 29 including at least a second first grating region embedded in the waveguide and having a multitude of grating elements constituted by axially successive refractive index variations in solid material of the waveguide and extending at such respective spacings to redirect at least some components of the light reaching said grating elements within the waveguide, the first region gratings constituting a resonator.

32. A system as claimed in claim 29 including at least one second first grating region embedded in the waveguide region having a multitude of grating elements constituted by axially successive refractive index variations, and extending at such respective spacings to redirect at least some components of the light reaching said grating elements the first and second grating being spaced about the target thereby to form a resonator about the target.

33. An analytical system comprising:

multiple waveguides of solid material capable of guiding input light along a first path from a first end of each waveguide towards a second end;

at least one grating region embedded in at least one waveguide and having multitude of grating elements constituted by axially successive refractive index variations and extending at such respective spacings to redirect at least some components of the light reaching said grating elements within the waveguide means external to the waveguides for receiving the light for analytical determination of the components of the light, the multiple waveguides being located in physical adjacency relative to each other on a substrate; and multiple detectors in relative location with the substrate for respectively measuring components of the light emanating from the respective multiple waveguides.

34. A system is claimed in claim 33 including for each waveguide capillary means in adjacency with the waveguide wherein the input light to the waveguide is obtained from the capillary means carrying a fluid, and means for directing the light emanating from the capillary means as a result of reaction with the fluid passing through the capillary as the input light to the waveguide.

35. A method of analyzing light travelling along an elongated waveguide comprising:

guiding an input light along a first elongated path from a first end of a waveguide of solid material towards a second end of the waveguide;

redirecting at least one component of light from the waveguide by a first grating region embedded in the waveguide, the grating region including grating elements constituted by axially successive refractive index variations in the solid material, externally to the waveguide; and analyzing the redirected light for determination of the components of the light.

36. A method as claimed in claim 35 including spectroscopically analyzing the components of light.

37. A method as claimed in claim 35 including analyzing the emitted light to obtain a measure of the light fluorescence.

38. A method as claimed in claim 37 including embedding at least two different first grating regions in the waveguide, each respective first grating region acting to reflect light of different wavelengths from the waveguide.

39. A method as claimed in claim 35 including embedding at least one other second grating, such other second grating acting as a filter grating, the filter grating acting to reject light of selected wavelengths prior to interaction of the light with the first grating region.

40. A method as claimed in claim 35 including detecting the light in adjacency with the waveguide by the detector acting to measure the components of light redirected from the waveguide.

41. A method as claimed in claim 35 including locating multiple waveguides in physical adjacency relative to each other on a substrate; and locating multiple detectors adjacent to the substrate thereby to measure light components emanating from the respectively different waveguides.

42. A method as claimed in claim 41 including locating the multiple detectors on an integrated chip, and locating the integrated chip in physical adjacency with the substrate thereby to align the multiple waveguides to a respective multiple detectors, and wherein the multiple waveguides and multiple detectors are integrated into a single unit.

43. A method as claimed in claim 35 including locating capillary means in adjacency with the waveguide, passing fluid through the capillary, subjecting the capillary to incident light, and directing the light emanating from the capillary as a result of reaction with the fluid passing through the capillary as the input light to the waveguide.

44. A method as claimed in claim 43 including analyzing the fluorescence of the fluid passing through the capillary.

45. A method as claimed in claim 35 including rejecting light components of a selected wavelength by the first grating region, and wherein such rejected light components eliminate undesirable scattered light by redirecting such light components out of the waveguide, and detecting light components passing through an end of the waveguide remote from the first end.

46. A method as claimed in claim 35 including locating a sample adjacent to the first end of the waveguide, passing light through the sample and passing light emanating from the sample into the first end of the waveguide.

47. A method as claimed in claim 35 including passing the inputted light through a filter grating located downstream from the first end of the waveguide, the filter grating being ahead of the first grating region for redirecting light at predetermined wavelengths.

48. A method as claimed in claim 35 including redirecting light components at preselected wavelengths from the waveguide, and including detecting the redirected light adjacent to the waveguide.

49. A method of guiding light in a waveguide light system comprising:

directing light towards a predetermined position along a first waveguide having an embedded grating region, the grating region having a multitude of grating elements constituted by axially successive refractive index variations in the waveguide, and extending at such respective spacings to redirect at least some components of the light reaching the grating elements within the first waveguide;

receiving light from the predetermined position through a second waveguide;

locating at the predetermined position a target through which the light is directed.

50. A method as claimed in claim 49 wherein the first waveguide and second waveguide are located relatively transverse to each other.

51. A method as claimed in claim 49 including locating a capillary tube at the target position, and wherein the capillary tube has an outer diameter and a capillary bore, and wherein the capillary tube is located substantially transverse to the first waveguide and second waveguide.

52. A method as claimed in claim 51 including reflecting light directed from the first waveguide back through the capillary tube opposite to the second waveguide thereby to facilitate transmission of light along the second waveguide.

53. A method of analyzing light including locating multiple elongated waveguides in spaced relationship on a substrate, the waveguides including means at one end for directing light from respective samples through respective waveguides and at least one grating region embedded in at least one waveguide, said grating region having a multitude of grating elements constituted by axially successive refractive index variations extending at such respective spacings to redirect at least some components of the light reaching said grating elements within the waveguide, outputting multiple outputs from the multiple waveguides respectively to multiple detector means for analyzing the multiple outputs from the respective waveguides.

54. A method as claimed in claim 53 including redirecting at least some components of the light travelling in the elongated waveguides traversely from the waveguides and detecting the transversely redirected light components.

55. A method as claimed in claim 53 including directing light to the respective waveguides firstly through respective capillary means, the capillary means being located in adjacency with a respective waveguides.

56. A method as claimed in claim 55 including detecting the outputs of the waveguides through a multiple element array detector, the respective elements of the array being for analyzing the light output from a respective waveguide.

57. A method as claimed in claim 56 including locating a spectral dispersive imaging means between the detector and the output from the waveguide, the dispersive means being for deflecting different light wavelength bands from the output of the respective waveguide elements.

* * * * *